(12) United States Patent
Agarwal et al.

(10) Patent No.: US 9,796,308 B2
(45) Date of Patent: Oct. 24, 2017

(54) FLEXIBLE LUMBAR SUPPORT OF AIRCRAFT SEAT

(71) Applicant: HAMILTON SUNDSTRAND CORPORATION, Windsor Locks, CT (US)

(72) Inventors: Ashish Kumar Agarwal, Bangalore Karnataka (IN); Satya Swaroop Panda, Karnataka (IN)

(73) Assignee: AMI INDUSTRIES, INC., Colorado Springs, CO (US)

( * ) Notice: Subject to any disclaimer, the term of this patent is extended or adjusted under 35 U.S.C. 154(b) by 107 days.

(21) Appl. No.: 14/704,184

(22) Filed: May 5, 2015

(65) Prior Publication Data

US 2016/0325661 A1 Nov. 10, 2016

(51) Int. Cl.
*B60N 2/66* (2006.01)
*B64D 11/06* (2006.01)
*B64D 11/00* (2006.01)

(52) U.S. Cl.
CPC ............ *B60N 2/66* (2013.01); *B60N 2/6671* (2015.04); *B64D 11/00* (2013.01); *B64D 11/06* (2013.01); *B64D 11/0639* (2014.12); *B64D 11/0647* (2014.12)

(58) Field of Classification Search
USPC .......................................... 297/284.4, 284.7
See application file for complete search history.

(56) References Cited

U.S. PATENT DOCUMENTS

| 3,762,769 | A | * | 10/1973 | Poschl | A47C 7/462 297/284.4 |
| 4,909,568 | A | * | 3/1990 | Dal Monte | B60N 2/667 297/284.4 |
| 5,174,526 | A | | 12/1992 | Kanigowski | |
| 5,921,629 | A | * | 7/1999 | Koch | B64D 11/06 244/118.6 |
| 6,089,664 | A | * | 7/2000 | Yoshida | A47C 7/425 297/112 |
| 6,695,402 | B2 | * | 2/2004 | Sloan, Jr. | A47C 7/46 297/284.4 |
| 6,783,183 | B2 | * | 8/2004 | Tseng | A47C 4/02 297/440.11 |

(Continued)

OTHER PUBLICATIONS

European Search Report for EP application No. 16168511.0 dated Oct. 21, 2016.

*Primary Examiner* — David E Allred
(74) *Attorney, Agent, or Firm* — Cantor Colburn LLP

(57) ABSTRACT

A flexible lumbar support for an aircraft seat includes a frame and flexible seat pad connected thereto for supporting a seat user. At least first and second rods are spaced from each other and the frame, extend across and are secured to the seat pad, and define respectively at least first and second control lines about which the seat pad is rotatable. A third rod is spaced from the seat pad, extends across and is secured to the frame, and defines a third control line. At least a first actuator extends between and is attached to the first and third rods. A second actuator extends between and is attached to the second and third rods. The actuators are movable along the frame and pivotable about the third control line for allowing a change of respective positions of the control lines to generate multiple profiles of the flexible lumbar support.

13 Claims, 2 Drawing Sheets

(56) References Cited

U.S. PATENT DOCUMENTS

| | | | |
|---|---|---|---|
| 7,458,637 B2* | 12/2008 | Norman | A47C 7/46 297/284.4 |
| 7,896,438 B2* | 3/2011 | Whelan | A47C 7/405 297/284.4 |
| 8,360,522 B2* | 1/2013 | Akutsu | B60N 2/42781 297/284.4 |
| 8,528,980 B1* | 9/2013 | Hsiao | A47C 7/46 297/284.4 |
| 2002/0113472 A1* | 8/2002 | Blendea | B60N 2/0232 297/284.4 |
| 2004/0108760 A1* | 6/2004 | McMillen | B60N 2/6671 297/284.4 |
| 2005/0275263 A1 | 12/2005 | Norman et al. | |
| 2006/0061169 A1* | 3/2006 | Kohl | B60N 2/4415 297/284.4 |
| 2006/0214476 A1* | 9/2006 | Rojas | A47C 4/30 297/3 |
| 2006/0244293 A1* | 11/2006 | Buffa | B60N 2/66 297/284.4 |
| 2007/0108816 A1* | 5/2007 | McQueen | A47C 7/465 297/284.4 |
| 2007/0236063 A1* | 10/2007 | Blendea | A47C 7/465 297/284.4 |
| 2009/0152916 A1* | 6/2009 | Lin | A47C 1/032 297/217.3 |
| 2014/0103688 A1* | 4/2014 | Wilson | A47C 1/03211 297/284.7 |
| 2015/0091349 A1* | 4/2015 | Hong | B60N 2/6671 297/284.7 |
| 2016/0059757 A1* | 3/2016 | McMillen | B60N 2/66 297/284.8 |

* cited by examiner

FLEXIBLE LUMBAR SUPPORT OF AIRCRAFT SEAT

BACKGROUND

The invention relates to, in general, arrangements for adjustable seating and, in particular, a flexible lumbar support for use in a seat of an aircraft.

Seating arrangements offer different features for comfort, such as reclining, a flexible back, environmental control, etc. With respect to the flexible back, ergonomics involves a profile or shape of the lumbar. Ergonomics and lumbar profiles vary for individuals with different height, seating posture, gender, body build, weight, etc. However, most of the known seating arrangements have a configuration catering to needs of an average individual, are complex, or can generate a only limited number of profiles of the lumbar (i.e., they provide limited flexibility).

BRIEF DESCRIPTION

In a non-limiting exemplary embodiment according to the invention, a flexible lumbar support for use in a seat of an aircraft is provided. The flexible lumbar support includes a frame and flexible seat pad connected to the frame and configured to support a user of the seat. At least first and second rods are spaced from each other and the frame, extend across and are secured to the seat pad, and define respectively at least first and second control lines about which the seat pad is configured to rotate. A third rod is spaced from the seat pad, extends across and is secured to the frame, and defines a third control line. At least a first actuator extends between and is attached to the first and third rods, and a second actuator extends between and is attached to the second and third rods. The actuators are configured to move along the frame and pivot about the third control line for allowing a change of respective positions of the control lines to generate multiple profiles of the flexible lumbar support. In a non-limiting exemplary embodiment according to the invention, a seat of an aircraft including the flexible lumbar support is provided.

The flexible lumbar support according to the invention includes components made of moderately stiff material that can flex to produce alternate profiles by changing the control points. Also, the flexible lumbar support can generate a desired curved spline with the control points. More specifically, the control points can be moved in planar space to generate multiple splines. In this way, the flexible lumbar support can flex a lumbar to yield different lumbar profiles. As a result, the flexible lumbar support is simple and provides more flexible, customized, and comfortable seating that caters to individual needs and meets ergonomic requirements.

BRIEF DESCRIPTION OF DRAWING

The subject matter that is regarded as the invention is particularly pointed out and distinctly claimed in the claims at the conclusion of the specification. The foregoing and other features and advantages of the invention are apparent from the following detailed description taken in conjunction with the accompanying drawing in which:

DETAILED DESCRIPTION

The figures show a non-limiting exemplary embodiment of a flexible lumbar support according to the invention, generally indicated at 10. The flexible lumbar support 10 is configured for use in a seat, generally indicated at 12, of an aircraft (not shown). In this regard, it should be readily appreciated that the flexible lumbar support 10 can be implemented with any suitable aerospace-related application. However, it should be readily appreciated also that the flexible lumbar support 10 can be implemented with any suitable application. By way of example only and not by way of limitation, the flexible lumbar support 10 can be implemented with automotive, railway, and passenger-liner-ship applications.

Figure 1:
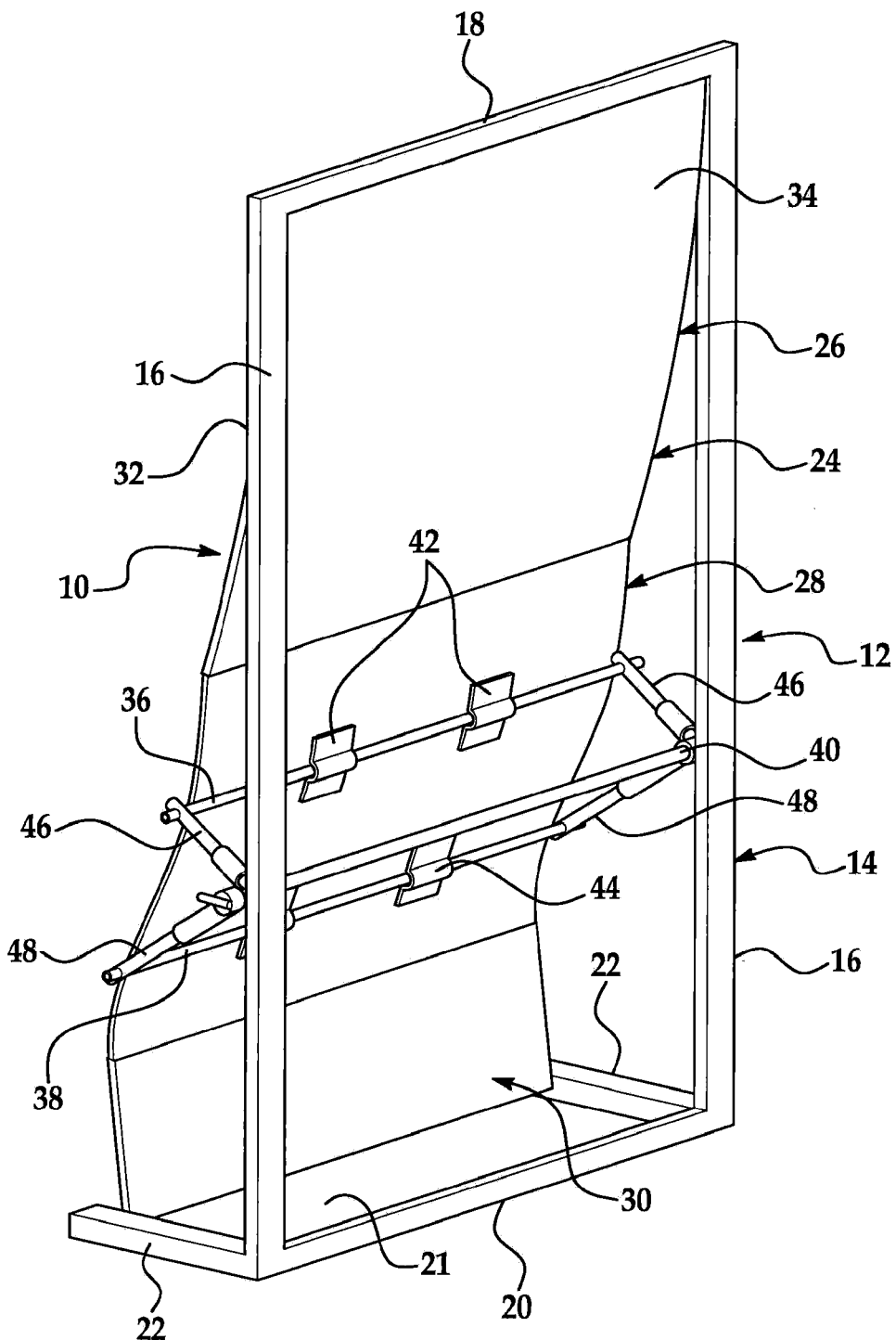
FIG. 1 is a rear perspective isometric view of a non-limiting exemplary embodiment of a flexible lumbar support for use in a seat of an aircraft in accordance with the invention showing the support supported in a frame of the seat.

Referring now to FIG. 1, a rear perspective isometric view shows the flexible lumbar support 10 supported in the seat 12. More specifically, the seat 12 includes an upright frame, generally indicated at 14, supporting the flexible lumbar support 10 and serving as a platform for supporting also a cushioning and upholstery (not shown) of the seat 12. The frame 14 defines a substantially "L-shaped" longitudinal cross-section and is configured to provide structural rigidity to the seat 12.

More specifically, the frame 14 includes a vertical section having a pair of spaced, generally parallel vertical rails 16. A pair of spaced, generally parallel upper and lower horizontal rails 18, 20 respectively extend between corresponding upper and lower ends of the vertical rails 16. The lower horizontal rail 20 is shown supported upon a surface 21. The vertical rails 16 are longer than the horizontal rails 18, 20 such that the vertical section of the frame 14 defines a generally rectangular longitudinal cross-section. The vertical section represents a vertical axis A of the frame 14.

The frame 14 includes also a horizontal section having a pair of opposed, spaced, generally parallel base rails 22 respectively extending from left and right ends of the lower horizontal rail 18, 20 and generally perpendicular to both the vertical and horizontal rails 16, 18, 20. The base rails 22 are shown supported upon the surface 21. The base rails 22 are shorter than the horizontal rails 18, 20 such that the horizontal section of the frame 14 defines a generally open-sided rectangular longitudinal cross-section a length of which runs generally perpendicular to a length of the vertical section (an open side of the horizontal section is defined opposite the lower horizontal rail 20). The vertical section is larger than the horizontal section, and an imaginary plane defined by the vertical section is generally perpendicular to an imaginary plane defined by the horizontal section.

Each of the rails 16, 18, 20, 22 defines a generally rectangular transverse cross-section. The rails 16, 18, 20, 22 are generally uniform with respect to each other such that each of the rails 16, 18, 20, 22 defines generally a same height and width as each of the other rails 16, 18, 20, 22 (the rails 16, 18, 20, 22 differing from each other only in their respective lengths). In an aspect of the embodiment, the frame 14 is made of metal.

It should be readily appreciated that the frame 14 can have any suitable shape, size, and structure and the rails 16, 18, 20, 22 can have any suitable relationship with each other. It should be readily appreciated also that each of the rails 16, 18, 20, 22 can have any suitable shape, size, and structure. It should be readily appreciated also that the frame 14 can be made of any suitable material.

Still referring to FIG. 1, the flexible lumbar support 10 includes a flexible seat pad, generally indicated at 24, that is suspended from the upper horizontal rail 18 of the frame 14 and configured to support a user of the seat 12 on a side of the seat pad 24 located opposite the vertical section of the frame 14. More specifically, the seat pad 24 defines a generally rectangular longitudinal cross-section and extends from the upper horizontal rail 18 to the surface 21. A width of the seat pad 24 is generally identical to a width of the frame 14 such that a top portion of the seat pad 24 is framed by an upper portion of the vertical section of the frame 14.

As the seat pad 24 extends downwardly, the seat pad 24 is drawn generally progressively farther away from the vertical section of the frame 14. As such, generally progressively more space is defined between the vertical rails 16 and the seat pad 24, and a bottom portion of the seat pad 24 is framed by the horizontal section of the frame proximate to the open side of the horizontal section. The bottom portion of the seat pad 24 is disposed between the base rails 22 such that frictional engagement between the base rails 22 and corresponding sides of the seat pad 24 restrains lateral movement of the seat pad 24 with respect to the frame 14.

The seat pad 24 is segmented to define a plurality of flexible segments of the seat pad 24. More specifically and as shown in the figure, the seat pad 24 is segmented into top, middle, and bottom segments, generally indicated at 26, 28, 30. The top and middle segments 26, 28 are generally of a same size as each other each of which defines a substantially square longitudinal cross-section. However, it should be readily appreciated that the top and middle segments 26, 28 may not be generally of the same size as each other. The bottom segment 30 is smaller than each of the top and middle segments 26, 28 and defines a substantially rectangular longitudinal cross-section. The top and middle segments 26, 28 are configured to pivot or rotate relative to each other, and the middle and bottom segments 28, 30 are configured to pivot or rotate relative to each other. The seat pad 24 (and top, middle, and bottom segments 26, 28, 30, in particular) defines front and rear faces 32, 34 of the seat pad 24.

It should be readily appreciated that the seat pad 24 can have any suitable shape, size, and structure. It should be readily appreciated also that the seat pad 24 can have any suitable relationship with the frame 14. It should be readily appreciated also that the seat pad 24 can define any suitable number of segments 26, 28, 30 each of which, in turn, defines any suitable shape and size. It should be readily appreciated also that the seat pad 24 may not be segmented. It should be readily appreciated also that the seat pad 24 can be made of any suitable material.

Still referring to FIG. 1, the flexible lumbar support 10 includes also first, second, and third rods 36, 38, 40 extending across the seat 12. More specifically, in an aspect, the first rod 36 extends across and is in contacting relationship with an entirety of a rear of the middle segment 28 of the seat pad 24. In particular, the first rod 36 is located about a third of the way down the middle segment 28 (and about a half of the way down the seat pad 24) and spaced from the vertical section of the frame 14. A length of the first rod 36 is greater than a width of the middle segment 28 such that ends of the first rod 36 extend equally slightly beyond corresponding sides of the seat pad 24. The first rod 36 is also secured to the middle segment 28. Toward that end, in an aspect, the middle segment 28 includes at least one support pad 42 configured to receive the first rod 36. In a version of this aspect, a pair of spaced-apart support pads 42 are symmetrically disposed across the middle segment 28, and the first rod 36 is received in and through respective bushings of the support pads 42. Each support pad 42 may be riveted to ensure continuity of shape across the flexible lumbar support 10.

The second rod 38 extends across and is in contacting relationship with an entirety of a rear of the middle segment 28. In particular, the second rod 38 is located about two-thirds of the way down the middle segment 28 (and more than half of the way down the seat pad 24) and spaced from the vertical section of the frame 14. In the figure, the second rod 38 is shown spaced a greater distance from the vertical section of the frame 14 than is the first rod 36. A length of the second rod 38 is greater than a width of the middle segment 28 such that ends of the second rod 38 extend equally slightly beyond corresponding sides of the seat pad 24. The second rod 38 is also secured to the middle segment 28. Toward that end, in an aspect, the middle segment 28 includes at least one support pad 44 configured to receive the second rod 38. In a version of this aspect, the support pad 44 is disposed about halfway across the middle segment 28 and below and halfway between the support pads 42, and the second rod 38 is received in and through a bushing of the support pad 44. The support pad 44 may be riveted to ensure continuity of shape across the flexible lumbar support 10.

The third rod 40 extends across an entirety and is in contacting relationship with an interior side (as viewed in the figure) of the vertical section of the frame 14. In particular, the third rod 40 is located about half of the way down the middle segment 28 [and more than half of the way down the vertical section of the frame 14 (but not as far down the frame 14 as is located the second rod 38 down the seat pad 24)] and spaced from the seat pad 24. A length of the third rod 40 is greater than a width of the vertical section of the frame 14 such that ends of the third rod 40 extend equally slightly beyond exterior sides of the vertical rails 16. The third rod 40 is also secured to the vertical rails 16.

The rods 36, 38, 40 are disposed substantially parallel with each other, and the respective lengths of the rods 36, 38, 40 are generally equal to each other. The rods 36, 38, 40 lie in different respective vertical imaginary planes. As discussed below, a distance between the first and third rods 36, 40 and second and third rods 38, 40 can vary.

It should be readily appreciated that each of the rods 36, 38, 40 can have any suitable shape, size, and structure and relationship with each of the other rods 36, 38, 40, frame 14, and seat pad 24. It should be readily appreciated also that the flexible lumbar support 10 can include any suitable number of rods 36, 38, 40. It should be readily appreciated also that each of the support pads 42, 44 can have any suitable shape, size, and structure and relationship with each of the other support pads 42, 44 and seat pad 24. It should be readily appreciated also that the seat pad 24 can include any suitable number of support pads 42, 44. It should be readily appreciated also that each of the first and second rods 36, 38 can be secured to the middle segment 28 of the seat pad 24 and the third rod 40 can be secured to the vertical rails 16 in any suitable manner. It should be readily appreciated also that the rods 36, 38, 40 can be made of any suitable material.

Still referring to FIG. 1, the flexible lumbar support 10 includes also first and second pairs of actuators 46, 48 extending from the interior side (as viewed in the figure) of the vertical section of the frame 14 toward the seat pad 24. More specifically, in an aspect, each of the first pair of actuators 46 extends between and is attached to a corresponding end of the first rod 36 and corresponding end of the third rod 40 (or a corresponding vertical rail 16). In a version, an end of each first actuator 46 defines a hole configured to receive the corresponding end of the first rod 36. Alternatively, the end of each first actuator 46 and corresponding end of the first rod 38 can be welded to each other. Each of the second pair of actuators 48 extends between and is attached to a corresponding end of the second rod 38 and corresponding end of the third rod 40 (or a corresponding vertical rail 16). In a version, an end of each second actuator 48 defines a hole configured to receive the corresponding end of the second rod 38. Alternatively, the end of each second actuator 48 and corresponding end of the second rod 38 can be welded to each other. Each first actuator 46 and its counterpart second actuator 48 lie in a same imaginary vertical plane as does the corresponding base rail 22 of the frame 14. Each first actuator 46 and its counterpart second actuator 48 also form an angle with each other, whereby a "point" of attachment of each first and corresponding second actuator 46, 48 to the frame 14 (or third rod 40) acts as the vertex of the angle and a size of the angle is variable.

It should be readily appreciated that each of the actuators 46, 48 can have any suitable shape, size, and structure and relationship with each of the other actuators 46, 48, frame 14, and rods 36, 38, 40. It should be readily appreciated also that the flexible lumbar support 10 can include any suitable number of actuators 46, 48. It should be readily appreciated also that each of the actuators 46, 48 can be attached to the corresponding first or second rod 36, 38 and third rod 40 (or vertical rail 16) in any suitable manner. It should be readily appreciated also that the actuators 46, 48 can be made of any suitable material.

Figure 2:
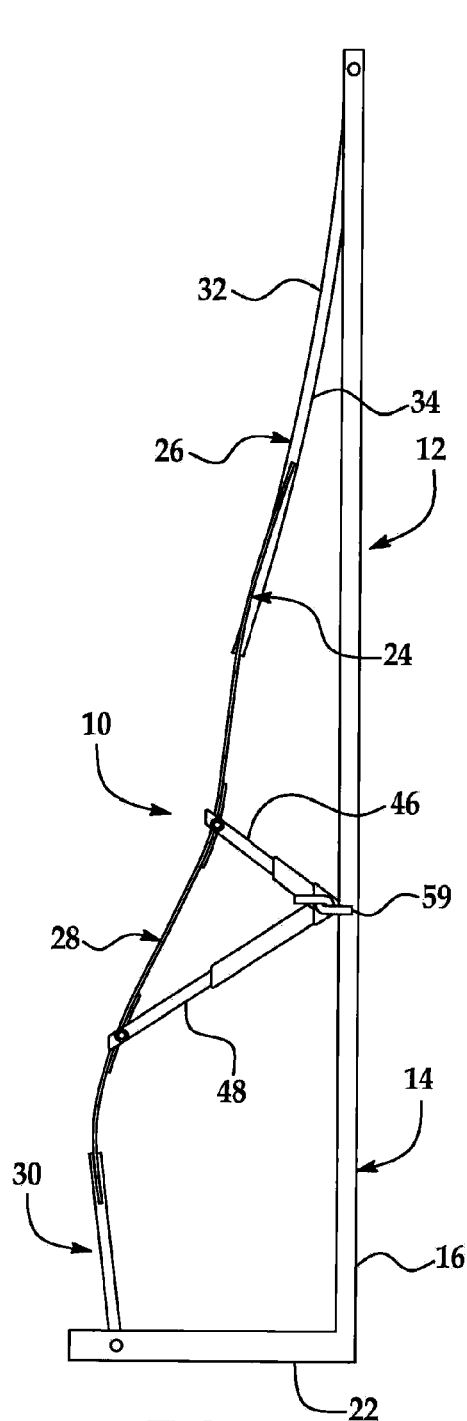
FIG. 2 is a side elevational view of the of the flexible lumbar support illustrated in FIG. 1 showing a curved spline with multiple control points.
Figure 3:
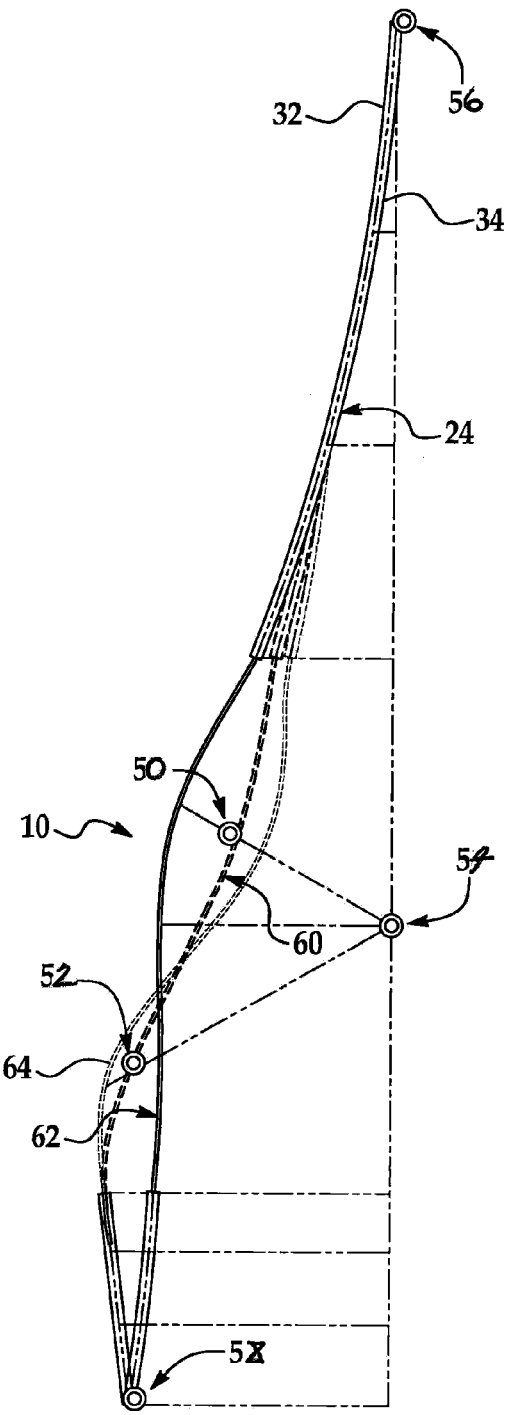
FIG. 3 is a geometric diagram of the flexible lumbar support illustrated in FIG. 1 showing effective ranges and positions of adjustment of the support.

Referring now to FIGS. 2 and 3, a side elevational view shows a curved spline of the flexible lumbar support 10, and a geometric diagram shows effective ranges and positions of adjustment of the flexible lumbar support 10, respectively. More specifically, FIG. 2 shows the top, middle, and bottom segments 26, 28, 30 and actuators 46, 48 of the flexible lumbar support 10. FIG. 3 shows first, second, third, fourth, and fifth control points 50, 52, 54, 56, 58 of the flexible lumbar support 10. The fourth and first control points 56, 50 correspond to upper and lower side points of the top segment 26. The first and second control points 50, 52 correspond to upper and lower side points of the middle segment 28. The second and fifth control points 52, 58 correspond to upper and lower side points of the bottom segment 30. In this way, the fourth and fifth control points 56, 58 represent end side points of the flexible lumbar support 10.

It should be readily appreciated that the one-dimensional control points 50, 52, 54, 56, 58 in the side view of FIG. 3 merely represent respective two-dimensional control lines 50, 52, 54, 56, 58. The fourth and first control lines 56, 50 correspond to upper and lower lines of the top segment 26. The first and second control lines 50, 52 correspond to upper and lower lines of the middle segment 28. The second and fifth control lines 52, 58 correspond to upper and lower lines of the bottom segment 30. In this way, the fourth and fifth control lines 56, 58 represent end lines of the flexible lumbar support 10.

A distance between the fourth and first control points 56, 50 can be fixed using the first actuator 46, and a distance between the second and fifth control points 52, 58 can be fixed using the second actuator 48. The top segment 26 is configured to pivot about the fourth control point 56, and the bottom segment 30 is configured to pivot about the fifth control point 58. The middle segment 28 is free to slide against the other two segments 26, 30, and a distance between the first and second control points 50, 52 is configured to be sufficiently great to accommodate various profiles. Respective positions of the first and second control points 50, 52 may be changed by using the corresponding actuators 46, 48.

By way of example only and not by way of limitation, each actuator 46, 48 can be a piston/cylinder assembly with spring-loaded cable-crank mechanisms. Alternatively, a ratchet-and-pinion type or an electrically driven actuator (i.e., a linear actuator) can be used as desired. However, it should be readily appreciated that each actuator 46, 48 can be any suitable type of actuator.

The segments 26, 28, 30 of the seat pad 24 and first, second, fourth, and fifth control points 50, 52, 56, 58 together make up a spline a shape of which may be varied to generate multiple profiles of the flexible lumbar support 10. A "slotted" design between the first and second segments 26, 28 and second and third segments 28, 30 is used to ensure sliding and maintain continuity and tangency between the first and second segments 26, 28 and second and third segments 28, 30, respectively, to ensure smoothness of the profile.

As shown in FIG. 1, the actuators 46, 48 are configured to pivot about the third control point 54 and be rotatable and movable along the vertical axis (represented by the vertical section of the frame 14) as needed. As shown in FIG. 2, a rotatable mechanism 59 is configured to lock the third control point 54 onto the frame 14. The actuators 46, 48 allow a change of respective positions of the first and second control points 50, 52 and act as corresponding load-carrying members from the seat pad 24 to the frame 14.

FIG. 3 shows possible shapes that can be generated using the flexible lumbar support 10. The respective shapes for average, maximum, and minimum positions of the control points 50, 52, 54, 56, 58 are highlighted. More specifically, the average shape is generally indicated at 60. The shape for a maximum of the first control point 50 and minimum of the second control point 52 is generally indicated at 62. The shape for a minimum of the first control point 50 and maximum of the second control point 52 is generally indicated at 64.

If the flexible lumbar support 10 is electrically actuated, the flexible lumbar support 10 can be integrated with a controller and interfaced with "smart" devices. Also, an application can suggest a best-suited profile for the seat user depending upon, for instance, his/her height and/or type of body. The best-suited profile may then be saved by the user for his/her future use of the seat 12.

The flexible lumbar support 10 includes components made of moderately stiff material that can flex to produce alternate profiles by changing the control points 50, 52, 54, 56, 58. Also, the flexible lumbar support 10 can generate a desired curved spline with the control points 50, 52, 54, 56, 58. More specifically, the control points 50, 52, 54, 56, 58 can be moved in planar space to generate multiple splines. In this way, the flexible lumbar support 10 can flex a lumbar to yield different lumbar profiles. As a result, the flexible lumbar support 10 is simple and provides more flexible, customized, and comfortable seating that caters to individual needs and meets ergonomic requirements.

While the invention has been described in detail in connection with only a limited number of embodiments, it should be readily appreciated that the invention is not limited to such disclosed embodiments. Rather, the invention can be modified to incorporate any number of variations, alterations, substitutions, or equivalent arrangements not heretofore described, but which are commensurate with the spirit and scope of the invention. Additionally, while various non-limiting embodiments of the invention have been described, it is to be readily appreciated that aspects of the invention may include only some of the described embodiments. Accordingly, the invention is not to be seen as limited by the foregoing description, but is only limited by the scope of the appended claims.

What is claimed:

1. A flexible lumbar support for use in a seat of an aircraft, the flexible lumbar support comprising:
    a frame;
    a flexible seat pad connected to the frame and configured to support a user of the seat;
    at least first and second rods spaced from each other and the frame, extending across and secured to the seat pad, and defining respectively at least first and second control lines about which the seat pad is configured to rotate and a third rod spaced from the seat pad, extending across and secured to the frame, and defining a third control line; and
    a first actuator extending between and attached to the first and third rods and a second actuator extending between and attached to the second and third rods, the actuators being connected to the third rod at or adjacent a common point of attachment between the first actuator, the second actuator and the third rod, the actuators configured to move along the frame and pivot about the third control line for allowing a change of respective positions of the control lines to generate multiple profiles of the flexible lumbar support.

2. The flexible lumbar support of claim 1, wherein the flexible lumbar support comprises further a fourth control line extending across an upper portion of the frame and about which a top segment of the seat pad is configured to rotate.

3. The flexible lumbar support of claim 2, wherein the flexible lumbar support further defines a fifth control line extending across a lower portion of the frame and about which a bottom segment of the seat pad is configured to rotate.

4. The flexible lumbar support of claim 3, wherein the first actuator fixes a distance between the first and fourth control lines and the second actuator fixes a distance between the second and fifth control lines, a middle segment of the seat pad is free to slide against the top and bottom segments, and a distance between the first and second control lines accommodates generation of multiple profiles of the flexible lumbar support.

5. The flexible lumbar support of claim 1, wherein each of the actuators comprises at least one of a piston and a cylinder assembly with one or more of spring-loaded cable-crank mechanisms, a ratchet-and-pinion mechanism, and an electrically driven actuator and each of the actuators acts as a corresponding load-carrying member from the seat pad to the frame.

6. The flexible lumbar support of claim 1, wherein the flexible lumbar support comprises further a rotatable mechanism configured to lock the third rod onto the frame.

7. The flexible lumbar support of claim 1, wherein the frame includes a vertical section defining a generally rectangular longitudinal cross-section and representing a vertical axis of the frame and a horizontal section defining a generally open-sided rectangular longitudinal cross-section, the vertical section is larger than the horizontal section, and a plane defined by the vertical section is generally perpendicular to a plane defined by the horizontal section.

8. The flexible lumbar support of claim 7, wherein the seat pad defines a generally rectangular longitudinal cross-section and extends from an upper portion of the vertical section of the frame to an outer portion of the horizontal section of the frame defined opposite the vertical section.

9. A seat of an aircraft comprising:
    a flexible lumbar support including:
        a frame having a pair of spaced, generally parallel vertical rails, a pair of spaced, generally parallel upper and lower horizontal rails respectively extend between corresponding upper and lower ends of the vertical rails, and a pair of opposed, spaced, generally parallel base rails respectively extending from ends of the lower horizontal rail;
        a flexible seat pad having a top segment suspended from the upper horizontal rail, a bottom segment disposed between and connected to the base rails, and a middle segment extending between the top segment and the bottom segment, the middle segment having first and second support pads;
        first and second rods spaced from each other and the frame, the first and second rods extending across and secured to the middle segment by the first and second support pads, respectively, and defining respectively at least first and second control lines about which the seat pad is configured to rotate and a third rod spaced from the seat pad, extending across and secured to the vertical rails of the frame, and defining a third control line that is locked onto at least one vertical rail of the frame by a rotatable mechanism; and
        a first actuator extending between and attached to the first and third rods and a second actuator extending between and attached to the second and third rods, the actuators being attached to the third rod at or adjacent the rotatable mechanism.

10. The aircraft seat of claim 9, wherein the flexible lumbar support comprises further a fourth control line extending across an upper portion of the frame and about which the top segment of the seat pad is configured to rotate.

11. The aircraft seat of claim 10, wherein the flexible lumbar support further defines a fifth control line extending across a lower portion of the frame and about which the bottom segment of the seat pad is configured to rotate.

12. The aircraft seat of claim 11, wherein the first actuator fixes a distance between the first and fourth control lines and the second actuator fixes a distance between the second and fifth control lines, a middle segment of the seat pad is free to slide against the top and bottom segments, and a distance between the first and second control lines accommodates generation of multiple profiles of the flexible lumbar support.

13. The aircraft seat of claim 9, wherein each of the actuators comprises at least one of a piston and a cylinder assembly with one or more of spring-loaded cable-crank mechanisms, a ratchet-and-pinion mechanism, and an electrically driven actuator and each of the actuators acts as a corresponding load-carrying member from the seat pad to the frame.

* * * * *